United States Patent
Mastanduno et al.

(10) Patent No.: US 9,371,991 B2
(45) Date of Patent: Jun. 21, 2016

(54) APPARATUS AND METHOD FOR VAPORIZING A LIQUID FUEL

(75) Inventors: Richard Mastanduno, Milford, CT (US); David Spence, Beacon Falls, CT (US); Subir Roychoudhury, Madison, CT (US); Bruce Crowder, North Haven, CT (US)

(73) Assignee: PRECISION COMBUSTION, INC., North Haven, CT (US)

( * ) Notice: Subject to any disclaimer, the term of this patent is extended or adjusted under 35 U.S.C. 154(b) by 389 days.

(21) Appl. No.: 13/996,688

(22) PCT Filed: Jan. 18, 2012

(86) PCT No.: PCT/US2012/000029
§ 371 (c)(1),
(2), (4) Date: Jun. 21, 2013

(87) PCT Pub. No.: WO2012/106048
PCT Pub. Date: Aug. 9, 2012

(65) Prior Publication Data
US 2013/0266903 A1  Oct. 10, 2013

Related U.S. Application Data

(60) Provisional application No. 61/462,396, filed on Feb. 1, 2011.

(51) Int. Cl.
*F23D 3/00* (2006.01)
*F23D 11/44* (2006.01)
(Continued)

(52) U.S. Cl.
CPC .............. *F23D 11/441* (2013.01); *C01B 3/386* (2013.01); *F23C 13/02* (2013.01); *F23D 11/443* (2013.01);
(Continued)

(58) Field of Classification Search
CPC ......... C01B 3/386; F23D 11/441; F23D 3/40; D23C 13/02; B01J 2208/00716; B01J 2208/0093; B01J 2208/11415; B01J 2208/00504; B01J 2208/00646; F02G 2254/70
USPC ....................................................... 431/11, 6
See application file for complete search history.

(56) References Cited

U.S. PATENT DOCUMENTS 3,978,836 A * 9/1976 Noguchi .............. F02M 31/163
                                                           123/179.21
4,100,905 A   7/1978 Nolan
(Continued)

FOREIGN PATENT DOCUMENTS

GB         19536 A    0/1908
GB        288195 A    1/1929
(Continued)

OTHER PUBLICATIONS

AIRTRONiC D2/D4—Operators Guide for Bunk Heater, Espar Products, Inc. Mississauga, Ontario, Canada, http://espar.com/html/products/technology_air.html, Apr. 8, 2010.

*Primary Examiner* — Jorge Pereiro
(74) *Attorney, Agent, or Firm* — Marie F. Zuckerman

(57) ABSTRACT

An apparatus and process for vaporizing and, optionally, igniting a liquid fuel, preferably, a distillate fuel. The apparatus includes the following components: a heat-conductive reticulated screen positioned within a chamber; a first inlet path into the chamber for delivering a liquid fuel onto the screen; a second inlet path into the chamber for contacting an oxidant with the screen and fuel; a means for heating the screen to a temperature sufficient to vaporize and, optionally, ignite the liquid fuel; and a recuperator in fluid communication with the chamber for transferring heat from the chamber to the second inlet path. The apparatus is suitably employed in compact and portable oxidation reactors, for example, in external combustion engines, catalytic partial oxidation reformers, and hybrid combustors operating in flame and/or catalytic modes.

17 Claims, 3 Drawing Sheets

(51) Int. Cl.
*C01B 3/38* (2006.01)
*F23C 13/02* (2006.01)
*F23L 15/04* (2006.01)
*F23D 3/40* (2006.01)

(52) U.S. Cl.
CPC .............. *F23D 11/448* (2013.01); *F23L 15/04* (2013.01); *C01B 2203/0261* (2013.01); *C01B 2203/1288* (2013.01)

(56) References Cited

U.S. PATENT DOCUMENTS

| | | | |
|---|---|---|---|
| 4,336,783 A | 6/1982 | Henson | |
| 4,459,805 A | 7/1984 | Kamiya | |
| 4,611,567 A | 9/1986 | Covey, Jr. | |
| 4,883,616 A | 11/1989 | Covey, Jr. | |
| 4,923,033 A * | 5/1990 | Panick | B60H 1/2212 126/116 R |
| 5,051,241 A * | 9/1991 | Pfefferle | B01D 53/9454 422/174 |
| 5,215,721 A | 6/1993 | Tasaki | |
| 5,529,035 A | 6/1996 | Hunt | |
| 5,590,526 A * | 1/1997 | Cho | F02G 1/043 60/517 |
| 5,855,192 A | 1/1999 | McCowan | |
| 6,156,444 A * | 12/2000 | Smith | B01J 35/04 29/6.1 |
| 6,198,038 B1 | 3/2001 | Shukla | |
| 6,213,761 B1 | 4/2001 | Schmidt | |
| 6,260,545 B1 * | 7/2001 | Suzuki | F02B 33/443 123/550 |
| 6,461,148 B1 | 10/2002 | Scotto | |
| 6,746,657 B2 * | 6/2004 | Castaldi | B01J 23/63 423/246 |
| 7,140,328 B2 | 11/2006 | Hsu | |
| 2001/0035463 A1 * | 11/2001 | Takagi | F23D 3/40 237/12 |
| 2003/0196381 A1 * | 10/2003 | Eberspach | B01B 1/005 48/197 FM |
| 2004/0009104 A1 * | 1/2004 | Kaupert | B01B 1/005 422/168 |
| 2004/0209205 A1 | 10/2004 | Gomez | |
| 2004/0255588 A1 * | 12/2004 | Lundberg | F23C 13/02 60/723 |
| 2005/0095544 A1 * | 5/2005 | Kaupert | B01B 1/005 431/262 |
| 2005/0196714 A1 | 9/2005 | Carroni | |
| 2006/0147859 A1 * | 7/2006 | Hoenig | F23C 99/006 431/156 |
| 2007/0084119 A1 * | 4/2007 | MacBain | B01J 8/0085 48/214 R |
| 2007/0151154 A1 | 7/2007 | Lyubovsky | |
| 2008/0078175 A1 * | 4/2008 | Roychoudhury | F02G 1/043 60/517 |
| 2008/0107937 A1 * | 5/2008 | Ravenda | B01J 8/0221 429/425 |
| 2008/0127553 A1 | 6/2008 | Roychoudhury | |
| 2009/0113889 A1 | 5/2009 | Roychoudhury | |
| 2009/0211243 A1 | 8/2009 | Hasko | |
| 2009/0252661 A1 | 10/2009 | Roychoudhury | |
| 2010/0024783 A1 | 2/2010 | Tao | |
| 2010/0126165 A1 | 5/2010 | Roychoudhury | |
| 2011/0146264 A1 * | 6/2011 | Roychoudhury | F02G 1/043 60/517 |

FOREIGN PATENT DOCUMENTS

| | | | |
|---|---|---|---|
| JP | 06213412 A * | 8/1994 | |
| JP | 2001227419 A | 8/2001 | |
| WO | WO2009114933 A1 | 9/2009 | |

* cited by examiner

APPARATUS AND METHOD FOR VAPORIZING A LIQUID FUEL

CROSS-REFERENCE TO RELATED APPLICATIONS

This application is a 371 filing of International Patent Application PCT/US2012/000029, filed Jan. 18, 2012, which claims the benefit of U.S. provisional patent application Ser. No. 61/462,396, filed Feb. 1, 2011.

GOVERNMENT RIGHTS

This invention was made with support from the U.S. government under Contract No. W15P7T-08-C-K401. The U.S. government holds certain rights in this invention.

FIELD OF THE INVENTION

In one aspect, this invention pertains to a method and apparatus for vaporizing and, optionally, igniting a liquid fuel. In another aspect, this invention pertains to an oxidation reactor, such as a combustor or fuel reformer, incorporating as one of its components the apparatus for vaporizing and, optionally, igniting a liquid fuel.

BACKGROUND OF THE INVENTION

Oxidation reactors and processes can be classified into two types. One type of apparatus comprises a combustor or burner for burning a fuel with an oxidant, such as air, into complete, that is deep, oxidation products, specifically, carbon dioxide and water, with production of heat of reaction. Burners find utility, for example, in cooking appliances and in providing heat to a heater head of an external combustion engine, such as, a Stirling engine. Complete combustion processes take place under fuel-lean reaction conditions in an excess of oxygen, as shown in Equation (1):

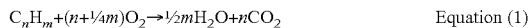

$$C_nH_m + (n+\tfrac{1}{4}m)O_2 \rightarrow \tfrac{1}{2}mH_2O + nCO_2 \qquad \text{Equation (1)}$$

Another type of oxidation apparatus comprises a fuel reformer for converting a hydrocarbon fuel with an oxidant into one or more incomplete, that is partially-oxidized, reaction products and heat of reaction. Preferably, the partially-oxidized reaction product comprises a gaseous fuel, preferably, synthesis gas comprising a mixture of carbon monoxide and hydrogen. Synthesis gas finds use in Fisher-Tropsch processes for preparing alcohols. Hydrogen obtainable from synthesis gas is a high value clean-burning fuel with applications in fuel cells and hydrogenation reactors. Partial or incomplete oxidation processes occur under fuel-rich conditions, wherein the quantity of oxidant is restricted relative to the quantity of fuel as shown in Equation (2):

$$C_nH_m + \tfrac{1}{2}nO_2 \rightarrow \tfrac{1}{2}mH_2 + nCO \qquad \text{Equation (2)}$$

Steam may be co-fed to the partial oxidation process to facilitate autothermal reforming.

Both deep and partial oxidation processes can be conducted in the presence or absence of a catalyst. In the absence of a catalyst, deep or partial oxidation occurs thermally; often such oxidation processes produce a flame. Use of a catalyst can reduce operating temperature and improve efficiency and selectivity to desired oxidation products. Moreover, catalytic oxidation is flameless, which provides for a lower noise profile.

The art discloses, for example in US 2008/0078175-A1, a catalytic combustor that provides heat to a heater head of an external combustion engine. The combustor comprises a high-pressure electromagnetic fuel injector for atomizing a liquid fuel into a combustion chamber wherein the fuel is vaporized by heating with a glow plug and/or by contact with a preheated flow of oxidant. The combined mixture of vaporized fuel and oxidant is contacted with a combustion catalyst, which is typically lit-off by means of a glow plug or spark plug, thereby producing deep oxidation products with exothermic heat of reaction. The heat of reaction thusly produced is transferred, in part, to the heater head of a Stirling engine or another heat acceptor surface and, in part, recuperated for heating the flow of oxidant.

The art also discloses, for example in US 2007-0151154-A1, a catalytic partial oxidation reformer, wherein a liquid fuel is delivered through a high-pressure electromagnetic fuel injector into a mixing chamber, wherein the fuel is heated and vaporized by means of a glow plug and/or contact with a preheated flow of oxidant and optionally steam. The combined mixture of vaporized fuel, oxidant, and optional steam is converted on contact with a reforming catalyst into one or more partially-oxidized reaction products, namely, carbon monoxide and hydrogen, with exothermic heat of reaction.

The art would benefit from development of burners and reformers that are light-weight, compact, and portable, with a low noise profile. A burner or reformer of this size and portability typically employs a fuel input greater than about 50 watts thermal ($50\,W_{th}$) and less than about 5 kilowatts thermal ($5\,kW_{th}$). The burner or reformer is desirably operated with a logistics fuel, such as diesel or jet propulsion fuel, preferably, over a time frame on the order of at least about 100 hours, and preferably, about 1,000 hours. Logistics fuels are distillate fuels. For the purposes of this invention, the term "distillate fuel" refers to a fuel oil obtained as a distillate fraction in refinery operations. A burner or reformer with the aforementioned features would meet requirements and possess desirable advantages for use in logistics, that is, field operations.

In large scale combustion and reforming reactors lacking portability, the high-pressure electromagnetic fuel injector provides an acceptable method for vaporizing a liquid fuel. Typically, such fuel injectors comprise a nozzle rated for a minimum fuel flow of about 19 cubic centimeters per minute ($19\,cm^3/min$) at a pressure of about 100 pounds per square inch (100 psi; 689 kPa). These nozzles might be capable, at best, of a 2:1 downturn to a fuel flow of about $9.5\,cm^3/min$ at 100 psi (689 kPa). In contrast, a compact and portable combustor or reformer employing a fuel input of about 300-400 watts thermal (300-400 $W_{th}$), optionally combined with a generating system having an output of about 80 watts electric ($80\,W_e$), requires a fuel flow between about $0.5\,cm^3/min$ at 100 psi (689 kPa) and about $1\,cm^3/min$ at pressures considerably less than 100 psi (689 kPa). These values are well below the usable minimum flow rate and pressure rating of conventional high-pressure electromagnetic injector nozzles. Moreover, at such low flow rates, the nozzle tends at high operating temperature to coke due to clogging of its flow path and/or orifice from fuel breakdown or coking. High-pressure electromagnetic injectors are incapable of operating with heavy fuels in combustors and reformers of compact and portable size for a time frame of 100 hours; let alone for the more than 1,000 hours that might be preferred for logistics operations. Moreover, high pressure electromagnetic injectors typically require air compression, which increases weight and parasitic power requirements and decreases efficiency and portability in a stand-alone system.

Other means of vaporizing a liquid fuel are known, but they too are not suitable for use with distillate fuels in logistics operations. Conventional electrostatic atomization for vaporizing a liquid fuel has the advantages of large fuel passages and acceptable function, but disadvantageously requires high voltage. Also, electrostatic atomization disadvantageously requires conductivity-enhancing chemical additives in the fuel and runs the risk of fuel ignition from electrical charge build-up during transient operation. Ultrasonic vaporization and piezoelectric vaporization are less conventional methods that are disadvantageously costly and undependable.

In view of the above, a need exists in the art to provide an apparatus and a method for vaporizing and, optionally, igniting a liquid fuel, preferably a distillate fuel, in a manner adaptable for use in compact, low weight, and portable combustors and fuel reformers. It would be more advantageous if such an apparatus were to have a low noise profile and could operate efficiently over a time frame of at least about 100 hours and, preferably, longer. It would be even more advantageous if such an apparatus had a low parasitic requirement, that is, a low energy demand from subsidiary pumps and blowers. All of the aforementioned attributes would render the vaporization apparatus and method desirable for use in logistics and field operations.

SUMMARY OF THE INVENTION

In one aspect, this invention comprises an apparatus for vaporizing and, optionally, igniting a liquid fuel, the apparatus comprising:
(a) a chamber comprising:
   (i) a heat-conductive reticulated screen positioned within the chamber;
   (ii) a first inlet path into the chamber, terminating in a first orifice proximate to the screen for delivering a liquid fuel onto the screen;
   (iii) a second inlet path into the chamber for contacting a flow of oxidant with the screen and the liquid fuel;
   (iv) a means for heating the screen to a temperature sufficient to vaporize and, optionally, ignite the liquid fuel; and
(b) a recuperator in fluid communication with said chamber for transferring heat in said chamber to the second inlet path.

In a second aspect, this invention pertains to a process for vaporizing and, optionally, igniting a liquid fuel, comprising:
(a) providing a chamber having positioned therein a heat-conductive reticulated screen and a means for heating the screen;
(b) delivering a liquid fuel into the chamber through a first inlet path terminating in a first orifice positioned proximate to the screen such that the liquid fuel is delivered onto the screen;
(c) feeding a flow of oxidant into the chamber through a second inlet path such that the oxidant contacts the screen and the liquid fuel;
(d) heating the screen thereby vaporizing and, optionally, igniting the liquid fuel; and
(e) recuperating heat in a recuperator positioned in fluid communication with said chamber and transferring said heat to the oxidant in the second inlet path.

Optionally, the aforementioned process of vaporizing and, optionally, igniting the liquid fuel further comprises step (f) de-energizing the means for heating the screen.

In a third aspect, this invention pertains to an oxidation reactor comprising:
(a) a chamber;
(b) a heat-conductive reticulated screen positioned within the chamber;
(c) an oxidation catalyst positioned within the chamber in fluid communication with the screen;
(d) a first inlet path into the chamber, which terminates in a first orifice proximate to the screen for delivering a flow of liquid fuel onto the screen;
(e) a second inlet path into the chamber for delivering a flow of oxidant into contact with the screen and the liquid fuel;
(f) a means for heating the screen to a temperature sufficient to vaporize and, optionally, ignite the liquid fuel;
(g) an outlet path in fluid communication with the oxidation catalyst for exiting combustion gases and heat of reaction from the chamber; and
(h) a recuperator positioned in fluid communication with the outlet path of the chamber for transferring heat of reaction from the outlet path to the second inlet path.

In a fourth aspect, this invention pertains to an oxidation process comprising:
(a) providing a chamber into which is positioned a heat-conductive reticulated screen, a means for heating the screen, and an oxidation catalyst in fluid communication with said screen;
(b) delivering a flow of liquid fuel into the chamber through a first inlet path terminating in a first orifice proximate to the screen, so as to deliver the liquid fuel onto the screen;
(c) delivering a flow of oxidant into the chamber through a second inlet path so as to contact the flow of oxidant with the screen and liquid fuel;
(d) heating the screen so as to vaporize and ignite the liquid fuel in flame mode;
(e) lighting-off the oxidation catalyst; and catalytically combusting or reforming the vaporized liquid fuel and oxidant thereby producing gaseous oxidation product and heat of reaction;
(f) exiting the gaseous oxidation product and heat of reaction through an outlet path positioned in fluid communication with the oxidation catalyst; and
(g) recuperating a portion of the heat of reaction in a recuperator positioned in fluid communication with the outlet path; and transferring the recuperated heat of reaction from the outlet path to the oxidant in the second inlet path.

Optionally, the aforementioned oxidation process further comprises step (h) extinguishing flame mode and operating catalytically and flamelessly. As a further option, the aforementioned oxidation process after step (g) or (h) further comprises step (i) de-energizing the means for heating the screen.

The novel method and apparatus of this invention find advantageous use in vaporizing and, optionally, igniting a liquid fuel, preferably a distillate fuel, including logistics fuels, such as JP-8 fuel. In contrast to prior art methods that use air-assisted high pressure electromagnetic nozzles to vaporize liquid fuels, the novel method and apparatus of this invention employ a low pressure design requiring less than about 0.75 kPa of air or fuel pressure (less than 3 inches water at 4° C.). The apparatus can also maintain steady-state operation using recuperated oxidant or burner air. In contrast to prior art electrostatic atomization methods, neither fuel additives nor high voltage is required of the present invention. Moreover, the vaporizer of this invention is particularly adaptable to micro-burner markets where fuel flow rates below about 100 cm$^3$/hr and low pressure drop are needed.

The apparatus and method of this invention can be more advantageously adapted for use with a hybrid burner, which operates in flame or catalytic mode or simultaneously in both flame and catalytic modes as described in detail hereinafter.

The hybrid burner is even more advantageous in facilitating rapid cold start-up wherein catalyst and incoming flows of fuel and oxidant are fed to the burner at ambient temperature, taken as a range from about −30° C. to about 35° C. Rapid cold start-up is preferably represented by heating from ambient temperature to flame operation in less than 1.3 minutes. Advantageously, facile start-up from ambient conditions minimizes parasitic energy demand required from a battery, which may be on-board and required to start the burner and any associated engine. Even more advantageously, the apparatus and method of this invention after start-up provide for efficient fuel combustion or reforming in flameless catalytic mode. The apparatus and process of this invention are most advantageously adapted for compact and portable burners and reformers having a fuel input of less than about 5 $kW_{th}$.

DRAWINGS

DETAILED DESCRIPTION OF THE INVENTION

Figure 1:
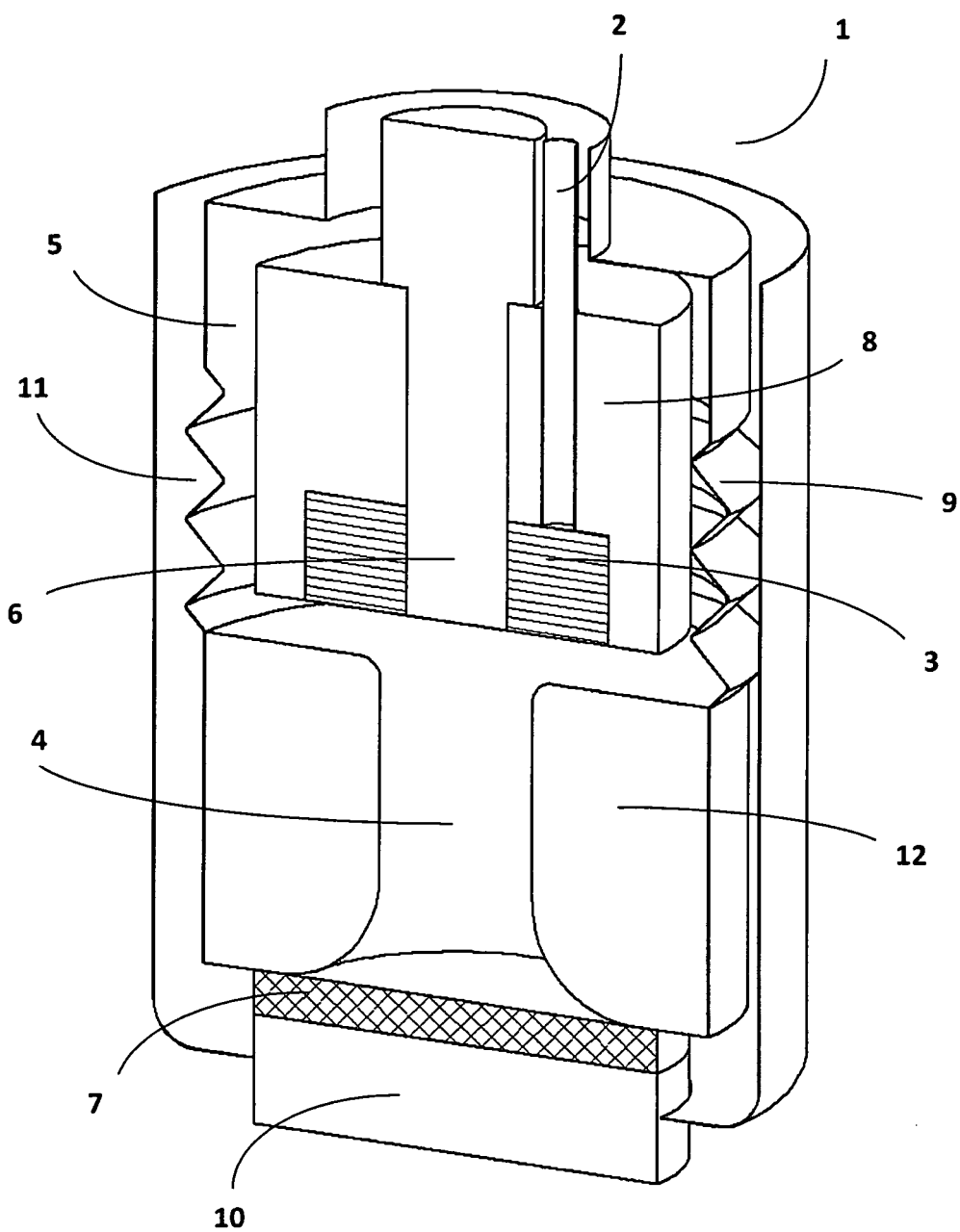
FIG. 1 depicts an isometric view of a preferred embodiment of the apparatus of this invention.

As summarized hereinabove, this invention pertains to an apparatus and process for vaporizing, and optionally igniting a liquid fuel, preferably a distillate fuel, useful in logistics operations. This invention also pertains to an oxidation reactor and oxidation process that employ the aforementioned apparatus and process of vaporizing the liquid fuel.

For the purposes of this invention, the term "liquid fuel" shall refer to any hydrocarbon fuel that, irrespective of viscosity, classifies as a liquid at a temperature ranging from about −30° C. to about 55° C. and at a pressure ranging from about 0.5 atmosphere (atm) to about 1 atm (that is, about 55 kPa to 101 kPa). The term "hydrocarbon" refers to any organic compound comprising carbon and hydrogen, such compounds to include aliphatic, cycloaliphatic, and aromatic hydrocarbons, or a mixture of the aforementioned hydrocarbons as known in the art. Such individual hydrocarbon compounds typically have from 5 to about 70 carbon atoms and a boiling point equal to or greater than 90° C. but less than about 700° C.

As used herein, the term "distillate fuel" refers to any hydrocarbon fuel obtainable as a distillate fraction in refinery operations. The distillate fuel suitable for this invention typically has a boiling point greater than about 120° C., and preferably, less than about 600° C. Hydrocarbon compounds in distillate fuel mixtures typically have from about 10 to about 70 carbon atoms each (that is, per hydrocarbon molecule), preferably, from about 10 to about 20 carbon atoms each.

Liquid fuels suitable for the process of this invention include, without limitation, gasoline, kerosene, diesel, and jet propulsion fuels, including for example, JP-8, JP-5, and JET A fuels. The preferred liquid fuel is a distillate fuel, more preferably selected from kerosene, diesel, and the jet propulsion fuels, particularly JP-8.

In a more preferred embodiment, this invention pertains to a hybrid burner for use with an external combustion engine, such as, a Stirling engine. The term "hybrid burner" refers to a combustor designed for operation in either flame or catalytic (non-flame) mode or operation simultaneously in both flame and catalytic modes.

In a more preferred hybrid burner, the incoming liquid fuel is delivered through a first inlet path onto and over a heat-conductive reticulated screen located within a combustion chamber. The heat-conductive reticulated screen can be heated resistively or heated via a glow plug to a temperature sufficient to produce vaporization of the fuel. The vaporized fuel is contacted with an incoming flow of oxidant, preferably air, delivered through a second inlet path over the screen and liquid fuel; and the heated mixture of fuel and air is ignited in a flame generating combustion products and heat of reaction within the chamber. A portion of the heat of reaction may be transferred via a heater head to a Stirling engine, where it is converted into mechanical or electrical energy. The balance of the heat of reaction exits the hybrid burner via an outlet through a recuperator, wherein at least a portion of the exiting heat of reaction is recuperated and used to pre-heat the incoming flow of oxidant. The heated in-coming flow of oxidant further heats the screen and fuel, which further vaporizes more fuel. At a certain point, the flame produces sufficient heat to light-off a combustion catalyst positioned downstream of the screen within the chamber, at which point combustion proceeds in both flame-stabilized and catalytic modes. Preferably, at this stage, the flame is extinguished by manipulation of the fuel and/or oxidant flow(s). The means for heating the screen may remain operational, if desired. As catalytic combustion progresses with further recuperation of heat of reaction, which is used to pre-heat the incoming oxidant flow and by conduction to heat the screen and fuel, vaporization and combustion become self-sustaining in catalytic mode. At this stage, if desired, the means for heating the screen can be de-energized. The hybrid burner of this invention advantageously provides for catalytic combustion from cold start-up, meaning that the combustion catalyst and incoming flows of fuel and oxidant are provided to the burner at ambient temperature with no pre-heating of the fuel or oxidant flows by an external source of heat, excepting for any small quantity of heat obtained from the means for heating the screen.

Thus, in a more preferred embodiment this invention provides for a hybrid burner comprising:
(a) a combustion chamber;
(b) a heat-conductive reticulated screen positioned within the combustion chamber;
(c) a combustion catalyst positioned within the combustion chamber in fluid communication with the screen;
(d) a first inlet path into the combustion chamber terminating in a first orifice proximate to the screen for delivering a flow of liquid fuel onto the screen;
(e) a second inlet path into the combustion chamber for delivering a flow of oxidant into contact with the screen and the liquid fuel;
(f) a glow plug positioned inside the chamber and proximate to the screen so as to vaporize and ignite the liquid fuel;
(g) an outlet path in fluid communication with the combustion catalyst for exiting a gaseous oxidation product from the combustion chamber; and
(h) a recuperator positioned in fluid communication with the outlet path for transferring heat of reaction from the outlet path to the second inlet path.

In yet another more preferred embodiment, this invention pertains to a combustion process in a hybrid burner comprising:
(a) providing a combustion chamber having positioned therein a heat-conductive reticulated screen, a glow plug positioned proximate to said screen, and a combustion catalyst in fluid communication with said screen;

(b) delivering a liquid fuel into the chamber through a first inlet path terminating in a first orifice so as to deliver the fuel onto said screen;

(c) delivering an oxidant into the chamber through a second inlet path such that the oxidant contacts the screen and liquid fuel;

(d) heating the screen either resistively or with the glow plug so as to vaporize and ignite the liquid fuel thereby initiating combustion in flame mode with heat of reaction;

(e) transferring a portion of the heat of reaction to the combustion catalyst so as to light-off the catalyst and thereby catalytically produce gaseous oxidation product and added heat of reaction;

(f) exiting the gaseous oxidation product and heat of reaction from steps (d) and (e) from the combustion chamber through an outlet path; and transferring a portion of the heat of reaction from the outlet path via a recuperator to the oxidant in the second inlet path;

(g) extinguishing the flame; and (h) optionally, de-energizing the glow plug.

Figure 2:
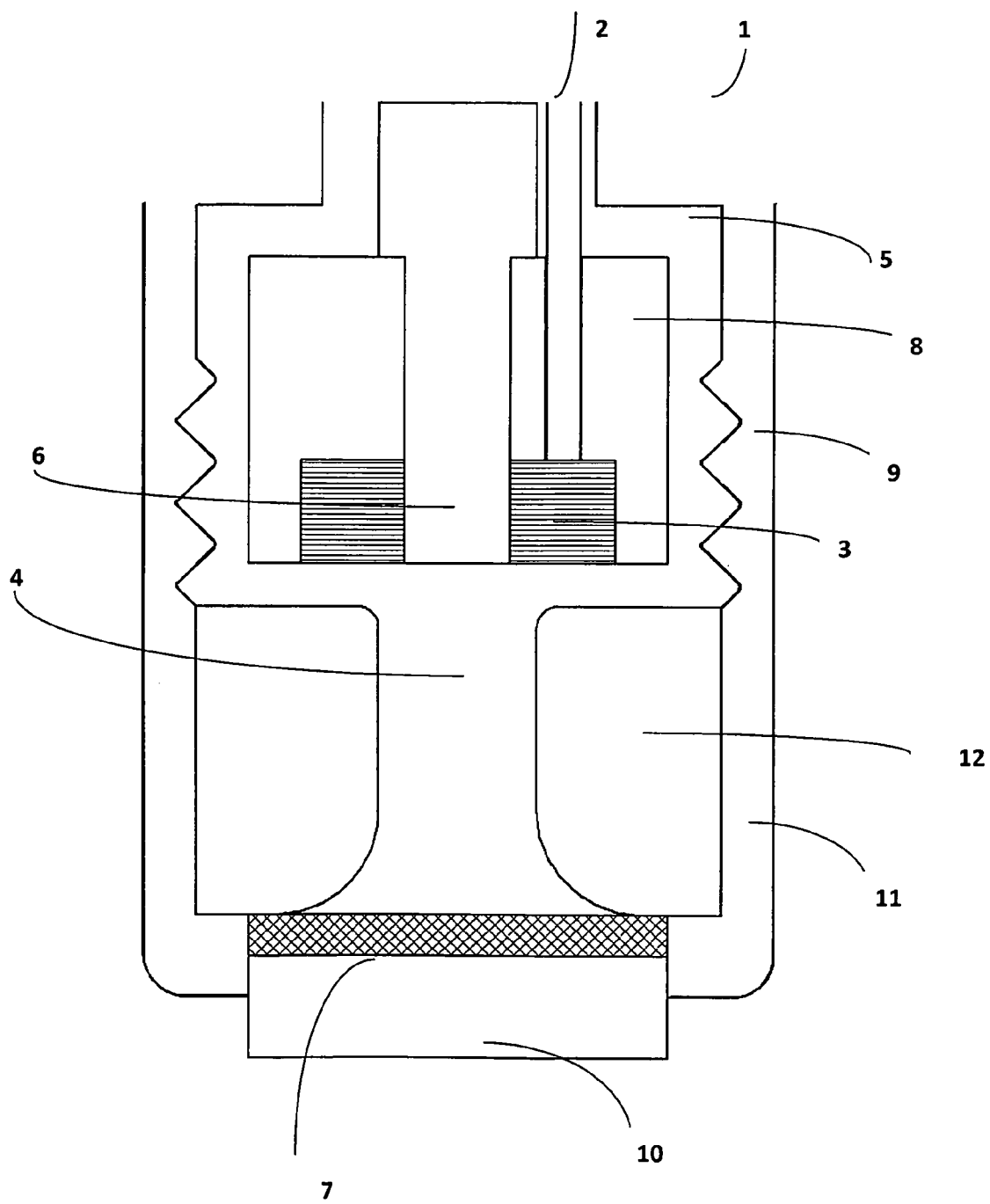
FIG. 2 depicts a longitudinal cross-sectional view of the preferred embodiment of the apparatus of FIG. 1.

With reference to FIG. 1 (isometric view) and FIG. 2 (longitudinal cross sectional view), a preferred embodiment of the invention is described pertaining to a hybrid burner 1. A liquid fuel is delivered and dispersed via a first inlet path 2 over a heat-conductive reticulated screen 3 positioned at one end of combustion chamber 4. The reticulated screen 3 is provided in this embodiment as a plurality of stacked donut-shaped screens. A flow of oxidant via a second inlet path 5 is fed into the combustion chamber 4 so as to contact the screen 3 and flow of liquid fuel delivered through the first inlet path 2. Glow plug 6 heats the screen 3, thereby vaporizing the liquid fuel and providing for ignition of the fuel on contact with the oxidant. The fuel and oxidant are combusted in combustion chamber 4 in flame mode, and combustion gases carrying heat of reaction flow through chamber 4 contacting and heating combustion catalyst 7 positioned within said combustion chamber 4 downstream of said glow plug 6 and said screen 3. When a sufficiently high temperature is reached, the catalyst lights-off and flameless catalytic combustion occurs producing one or more combustion products and heat of reaction. Combustion catalyst 7 may be positioned in direct contact (that is, non-spaced apart relation) with a heater head of a Stirling engine or any other heat acceptor surface, 10. The combustion gases exit via outlet 11. Heat of combustion in combustion gases exiting via outlet 11 is transferred via recuperator section 9 to the incoming oxidant in second inlet path 5. Housing portion 8 supporting the screen 3 and surrounding glow plug 6 is preferably provided with insulation to prevent first inlet path 2 from overheating, which might cause coking of the incoming fuel. Housing portion 12 provides walls that define combustion chamber 4. The area within the housing portion 12 may be hollow or insulated, as desired.

Second inlet path 5 provides a path for feeding the oxidant into the combustion chamber. The inner wall of second inlet path 5 is preferably insulated or constructed from a poor thermal conductor, so that incoming oxidant remains ambient or cool. This design keeps the housing 8 surrounding the first inlet path 2 (fuel inlet) at a cooler temperature, thereby avoiding coking of the fuel. The outer wall of second inlet path 5 is constructed at least in part of a heat-conductive material, preferably, sheet metal in a corrugated structure 9, so that heat from the combustion gases is recuperated from combustion gas outlet 11 and transferred to the incoming oxidant flowing in second inlet path 5. This design provides for heated oxidant contacting the heat-conductive reticulated screen 3 and the dispersed fuel.

The walls of the combustion chamber are constructed from any material that can withstand the heat of reaction. Typically, the combustion chamber is constructed from stainless steel, a nickel alloy, a nickel-chromium alloy, or any other heat resistant alloy.

Preferably, the heat-conductive reticulated screen comprises a metal or metal alloy that is sufficiently durable to withstand the heat of reaction. The term "heat-conductive" means that the screen is capable of transferring heat from a point of entry to other points throughout the screen. Metals typically are heat-conductive; therefore, the reticulated screen is preferably metallic. More preferably, the screen is constructed from stainless steel, a nickel-steel alloy, a nickel-chromium alloy (for example, Inconel® nickel-chromium), or any other heat resistant alloy. The screen itself has a reticulated, that is net-like, structure comprised of an array of heat-conductive metallic wires, threads, or fibers in-between which is a plurality of openings, that is, void spaces. The screen can be fabricated as a monolithic metal net or mesh or fabricated from a plurality of metal elements woven or brazed together. The diameter of the threads, fibers, or wires advantageously ranges from about 0.0005 inch (12.7 µm) to about 0.02 inch (508 µm). The openings or void spaces between the threads, fibers, or wires may take any shape including, for example, square, rectangular, circular, elliptical, diamond, or hexagonal, and any suitable size, preferably, ranging from about 0.0007 inch to about 0.020 inch (17.8 µm to about 508 µm) in length, diameter, or longest dimension. The screen may be provided as a substantially flat surface, or alternatively, in any other appropriate shape, for example, a circular band, a dome, a bowl, a donut, or a stack of donuts. The reticulated or net-like structure functions to break-up the liquid fuel into smaller droplets and disperse the droplets via wicking over the surface of the screen to facilitate vaporization and ignition. Heat-conductive reticulated screens are commercially available from McMaster-Carr, Robinsville, N.J.

As another option, the heat-conductive reticulated screen can be coated with one or more oxidation catalysts, suitable examples of which include without limitation the Group VIII metals, silver and gold, more preferably, the noble metals, these specifically comprising ruthenium, rhodium, palladium, osmium, iridium, platinum, silver, gold, and mixtures thereof. Methods for depositing metals onto reticulated screens or metal fibers are known in the art of catalysis.

The first inlet path for delivering fuel into the vaporization apparatus comprises a tube, the exterior surface of which comprises a heat resistant metal or metal alloy, such as those mentioned hereinbefore with respect to the materials of construction of the reticulated screen or combustor housing. The inner surface of the first inlet path may comprise the same heat resistant metal or metal alloy as found on the outer surface. Alternatively, in order to reduce coking of the fuel, the inner surface of the first inlet path may comprise a thermal insulator material or a passified metal surface, such as may be provided by Silicosteel® brand steel. The first inlet path terminates in a first orifice positioned proximate to the heat-conductive reticulated screen. The word "proximate" means that the first orifice is positioned near the screen in such a manner as to allow the fuel to flow or drip onto the screen without unacceptable delivery or loss of fuel to any other surface of the apparatus. Proximate positioning may also include having the first orifice contact the heat-conductive reticulated screen. The first orifice is not so small as to clog easily, but not so large as to render the delivery of fuel unacceptably slow. Advantageously, the first orifice has an inner diameter (I.D.) ranging from about 0.5 mm to about 5.0 mm, preferably, from about 0.5 mm to about 3.5 mm. Depending upon the size of the heat-conductive reticulated screen and the overall scale of the vaporization apparatus, it may be advantageous to provide a plurality of first inlet paths rather than only one first inlet path, so as to deliver additional fuel as may be needed or appropriate.

The second inlet path delivers the oxidant into contact with the heat-conductive reticulated screen and the liquid fuel. Typically, the second inlet path is positioned proximate to, but typically not touching, the screen, so as to deliver a majority, and preferably, substantially all of the oxidant to the vicinity of the screen. The actual proximity is not so critical, however, because the oxidant is gaseous and will therefore fill any cavity and space available in the area of the screen. The second inlet path is also constructed from a heat resistant material, such as, stainless steel, nickel alloy, nickel-chromium alloy, or other alloy, as appropriate.

This invention is not limited with respect to the oxidant so long as the effect of the invention is achieved. Suitable non-limiting examples of the oxidant generally include air, oxygen-rich air, essentially pure oxygen, and gas mixtures comprising oxygen and nitrogen as main components, the latter meaning that oxygen and nitrogen are each in a higher concentration relative to any other gaseous component(s). As other gaseous components, these are preferably non-reactive in the process and towards the oxidation catalyst, and can include, for example, helium, argon, and other inert gases. Among the aforementioned examples, the preferred oxidant consists of air or gas mixtures comprising oxygen and nitrogen as main components.

With reference to burner or flame applications, the quantities of fuel and oxidant employed are best expressed as an equivalence ratio defined herein as the molar ratio of fuel to oxidant actually fed to the reactor relative to the molar ratio of fuel to oxidant required for complete, that is, deep combustion to carbon dioxide and water. For burner applications, such as found in Stirling engines, the equivalence ratio is preferably maintained at 1:1 or less than 1:1. An equivalence ratio of 1:1 corresponds to the stoichiometric ratio needed for complete combustion of the fuel to carbon dioxide and water, as shown in Equation (1) hereinabove. An equivalence ratio of less than 1:1 corresponds to "fuel-lean" conditions. For catalytic partial oxidation processes (CPOX), which desirably produce one or more partially-oxidized reaction products, such as carbon monoxide and/or hydrogen, the process is preferably operated under "fuel-rich" conditions, namely, at an equivalence ratio greater than 1:1 as shown in Equation (2) hereinabove. Under these conditions, coke may form at the temperatures of the process, because fuel is provided in a molar excess relative to the oxidant. Accordingly, when operating fuel-rich, steam may be added to the oxidant flow or co-fed into the reactor as a separate stream to ensure that any coke produced is converted to additional carbon monoxide and hydrogen, as shown in Equation (3).

$$C + H_2O \rightarrow CO + H_2 \qquad \text{Eqn. (3)}$$

In the hybrid burners of this invention, which operate from cold start, the equivalence ratio starts fuel-lean or fuel-rich, preferably fuel-lean, as desired to initiate deep combustion of the fuel in flame mode. After catalyst light-off, the flows of fuel and/or oxidant can be modified to a fuel-rich ratio suitable for generating partial oxidation products.

The fuel flow onto the reticulated screen is adjusted according to the desired power output of the combustor, reformer, or hybrid burner. As an example, for an 80 Watt electric power output (80 $W_e$), assuming a 20 percent efficiency conversion from heat to electric power, 400 $W_{th}$ should be delivered in fuel input to the screen over the operating time. The flow rate will then depend upon the specific fuel employed and its fuel value. For JP-8 fuel, the flow rate to deliver 400 $W_{th}$ power can range from about 15 ml/h to about 60 ml/h. Once the fuel flow rate is established, the oxidant flow rate is adjusted depending upon the desired operating equivalence ratio.

The means for heating the screen may comprise a glow plug, or alternatively, an electrical circuit to resistively heat the screen. Sufficient heat should be input from the heating means to raise the temperature of the screen and fuel sufficient to vaporize and, optionally, ignite the liquid fuel. If a glow plug is used, it is positioned proximate to the heat-conductive reticulated screen such that radiant heat from the glow plug is capable of heating the screen and vaporizing the liquid fuel, optionally, with ignition. Glow plugs can be obtained commercially, for example, from Espar Heater Systems, a subsidiary of J. Eberspaecher GmbH & Co.

The oxidation catalyst is positioned in fluid communication with the heat-conductive reticulated screen and any glow plug assembly. The oxidation catalyst can comprise a deep oxidation catalyst or a partial oxidation catalyst, depending upon the desired mode of operation. Advantageously, the oxidation catalyst comprises an ultra-short-channel-length metal substrate, preferably, an ultra-short-channel-length metal substrate having deposited thereon one or more noble metals selected from ruthenium, rhodium, palladium, osmium, iridium, platinum, silver, gold, and mixtures thereof. Most preferably, the noble metal comprises rhodium or a mixture of rhodium with one or more other noble metals. The substrate is preferably a metal mesh or foam; but the invention is not limited to such structures; and other structures may be suitable. In a most preferred embodiment, the catalyst comprises a Microlith® brand ultra-short-channel-length metal mesh substrate having deposited thereon one or more of the aforementioned noble metals, as can be obtained from Precision Combustion, Inc., North Haven, Conn. Microlith® brand ultra-short-channel-length metal mesh substrate technology is a catalyst design concept comprising a series of ultra-short-channel-length, low thermal mass, metal monoliths that replace conventional prior art monoliths having longer channel lengths. For the purposes of this invention, the term "ultra-short-channel-length" refers to channel lengths in a range from about 25 microns (μm) (0.001 inch) to about 500 microns μm (0.02 inch). In contrast, the term "long channels" pertaining to prior art monoliths or honeycombs refers to channel lengths greater than about 5 mm (0.20 inch).

The preferred Microlith® brand ultra-short-channel-length metal mesh substrate promotes packing more active surface area into a smaller volume and provides increased reactivity area for a given pressure drop, as compared to prior art monoliths. In conventional honeycomb monoliths having conventional long channels, a fully developed boundary layer is present over a considerable length of the channels. In contrast, the ultra-short-channel-lengths characteristic of the Microlith® brand substrate avoids boundary layer buildup. Since heat and mass transfer coefficients depend on boundary layer thickness, avoiding boundary layer buildup enhances transport properties. The advantages of employing the ultra-short-channel-length metal substrate, and preferably, the Microlith® brand ultra-short-channel-length metal mesh substrate, to control and limit the development of a boundary layer of a fluid passing there through is described in U.S. patent application Ser. No. 10/832,055, which is a Continuation-In-Part of U.S. Pat. No. 6,746,657 to Castaldi, both incorporated in their entirety herein by reference. The Microlith® brand ultra-short-channel-length metal mesh substrate is also described in U.S. Pat. No. 5,051,241, and U.S. Pat. No. 6,156,444, both incorporated herein by reference.

Combustion gases exit the chamber downstream of the combustion chamber and/or the oxidation catalyst via an outlet comprising any conventional conduit able to withstand the heat of combustion. Suitable outlet materials of construction include the metals and alloys mentioned hereinbefore in connection with the combustor housing and the reticulated screen. At least a portion of the outlet connects to a recuperator, which is constructed from a heat-conductive wall that divides the exiting hot combustion gases from the incoming flow of oxidant. Thus, heat of reaction in the exiting gases is transferred internally through the heat-conductive wall to the incoming oxidant flow, thereby lowering the burden of external heat needed to raise the temperature of the oxidant.

At the point at which the recuperated heat of reaction is sufficient to provide vaporization of the liquid fuel and catalyst light-off, the process becomes self-sustaining in catalytic flameless mode. At that point, flame operation can be extinguished and, optionally, the means for heating the screen can be de-energized.

Combustion burners are typically operated at a temperature ranging from about 850° to about 1,200° C., preferably, from about 950° C. to about 1,100° C. The maximum temperature is chosen to facilitate durability of the reactor and catalyst. The pressure in the reactor can range from sub-atmospheric to super-atmospheric.

Catalytic partial oxidation (CPOX) reactors are typically operated at a temperature ranging from about 900° to about 1,200° C., preferably, from about 950° C. to about 1,100° C. Again, the maximum temperature is chosen to facilitate durability of the reactor and catalyst. The pressure in the CPOX reactor can also range from sub-atmospheric to super-atmospheric.

The following embodiment is presented as an illustration of the invention; however, the invention is not limited thereto. A person skilled in the field will understand that other embodiments of the invention are also operable and that components and steps of the invention can be substituted with equivalent components and steps falling within the scope of the invention and claims.

EXAMPLE

With reference to FIGS. 1 and 2, a hybrid burner 1 was constructed of stainless steel and operated in accordance with this invention. A fuel inlet path 2 was provided terminating in an orifice (0.063 inch; 1.6 mm diameter) in direct contact with one of a plurality of stainless steel reticulated screens 3 in the form of a stack of donuts. Each screen 3, obtained from McMaster-Carr, comprised wire threads of diameter 0.001 inch (0.025 mm) and a total of 500 wires per square inch (77.5/cm$^2$). A glow plug 6 was positioned in the donut-hole of the stacked screens. A combustion catalyst 7 was positioned downstream from the screens. The catalyst 7, a Microlith® brand ultra-short-channel-length metal mesh substrate having rhodium metal deposited thereon (Precision Combustion, Inc.), was positioned in direct contact with a heat acceptor 10 comprised of a stainless steel plate (¼ inch, 6.3 mm thickness). An outlet 11 for exiting combustion gases from the burner was provided as shown in FIGS. 1 and 2. A portion of the outlet 11 provided a recuperator section 9 for heat transfer from the exiting combustion gases to the incoming air in inlet path 5. In this embodiment, thermocouples (not shown in figures) were placed around the apparatus to measure the temperature of the following: inlet air, fuel-body (FIGS. 1 and 2, (8)), flame, catalyst at 6 and 12 o'clock positions, and heat acceptor head.

Figure 3:
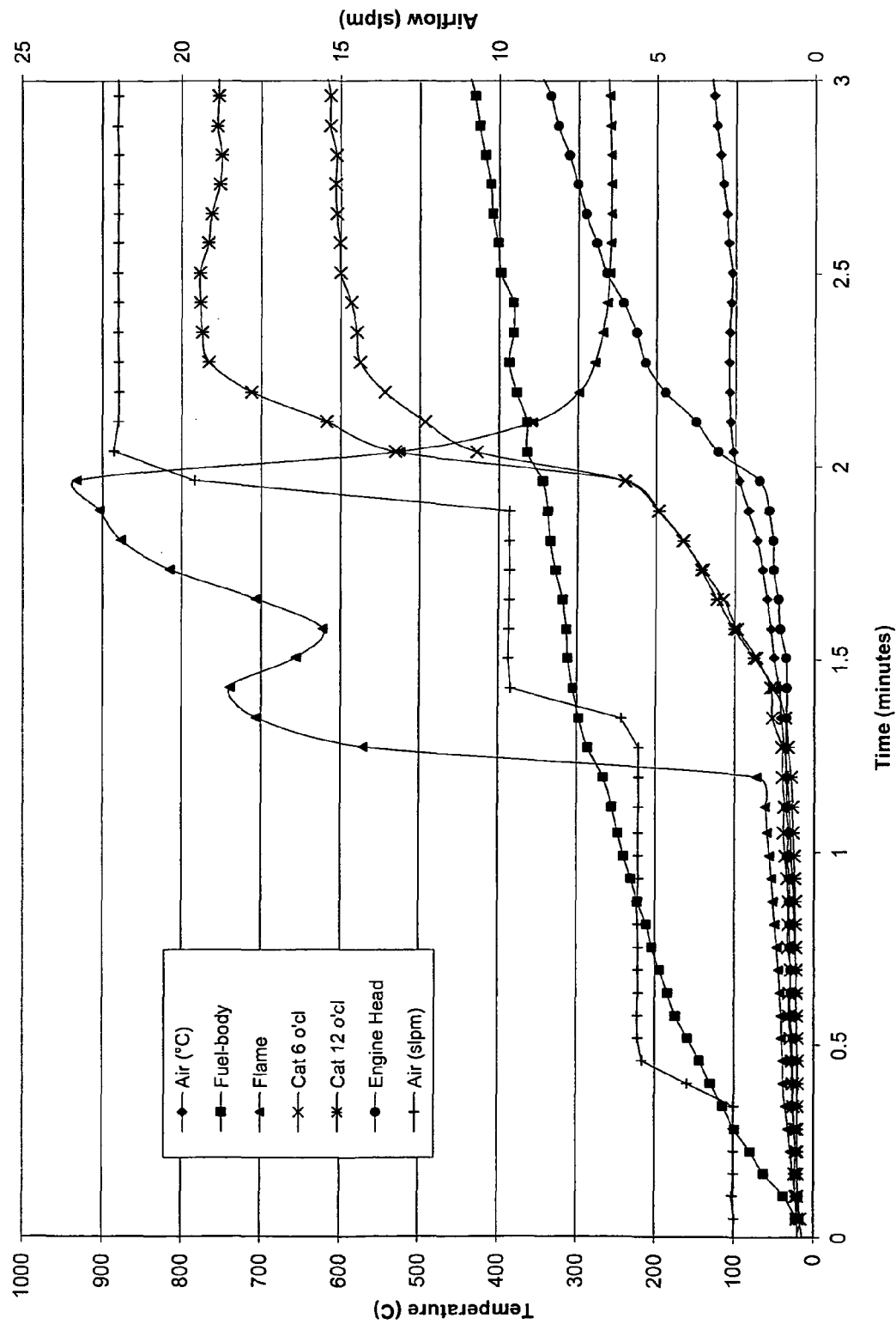
FIG. 3 depicts a graph of temperature and airflow versus run time for oxidation of a logistical fuel in a hybrid burner embodiment of this invention.

With reference to FIG. 3, JP-8 fuel was fed through the fuel inlet path at ambient temperature at a flow rate of 20 ml/hr (0.33 standard milliliters per minute, smlpm, taken at 0° C. and 101 kPa) for the first 20 seconds of operation. Air flow was started at a flow rate of 2.5 standard liters per minute (2.5 slpm) and increased at 20 seconds to 5.5 slpm. At 1.2 min operation the flame lit and the burner operated in flame mode. The fuel flow was then increased to 40 ml/hr (0.66 smlpm) at an increased air flow of 9.5 slpm. At 2 min operation, the catalyst lit-off. The fuel flow was increased to 60 ml/hr (0.99 smlpm; 600 $W_{th}$ fuel input) and the air flow was increased to 22 slpm, at which time the flame was extinguished; and the burner ran in flameless catalytic mode. The catalyst reached temperatures of 750° C. and 600° C. at the 12 o'clock and 6 o'clock positions, respectively. The fuel body (FIG. 1(8)) showed a steady increase in temperature from the ambient starting temperature to 400° C. in just 2.5 min. After catalyst light-off at 2 min, the heat acceptor head (FIG. 1(10), "engine head") showed a steady increase in temperature to 400° C. in only 1.3 additional min (3.3 min total from start). Autothermal catalytic operation was maintained for more than 100 hours without catalyst deactivation.

While the present invention has been described in considerable detail hereinabove, other configurations exhibiting the characteristics taught herein are contemplated for the apparatus and process of this invention. Therefore, the spirit and scope of the invention should not be limited to the description of the preferred embodiments described herein.

The invention claimed is:

1. An apparatus for vaporizing a liquid fuel, the apparatus comprising:
   (a) a chamber comprising:
      (i) a heat-conductive reticulated screen positioned within the chamber, the screen configured in an annular shape defining an inner diameter and an outer diameter and disposed around a central longitudinal axis of the chamber defining an upstream side and a downstream side of the screen;
      (ii) a first inlet path into the chamber, which terminates in a first orifice at the upstream side of the screen for delivering a liquid fuel onto the screen, the first orifice directly contacting the screen or disposed proximate to the screen, so as to drip the liquid fuel onto the screen;
      (iii) a second inlet path into the chamber terminating at the downstream side of the screen for contacting a flow of oxidant with the screen and the liquid fuel;
      (iv) disposed within the chamber a glow plug aligned along the central longitudinal axis of the chamber and disposed within a space defined by the inner diameter of the screen, the glow plug terminating flush with the downstream side of the screen;
      (v) a constriction in the chamber disposed downstream of the screen; and
   (b) a recuperator in fluid communication with said chamber, the recuperator configured to transfer heat in said chamber to the second inlet path.

2. A process for vaporizing a liquid fuel, comprising:
   (a) providing a chamber having positioned therein a heat-conductive reticulated screen configured in an annular shape defining an inner diameter and an outer diameter and disposed around a central longitudinal axis of the chamber defining an upstream side and a downstream side of the screen; and further having positioned therein a glow plug aligned along the central longitudinal axis of the chamber and disposed within a space defined by the inner diameter of the screen, the glow plug terminating flush with the downstream side of the screen; the chamber further having a constriction disposed downstream of the screen;

(b) delivering a liquid fuel into the chamber through a first inlet path having a first orifice terminating at the upstream side of the screen such that the first orifice directly contacts the screen or is disposed proximate to the screen, so as to drip the liquid fuel onto the screen;

(c) feeding a flow of oxidant into the chamber through a second inlet path terminating at the downstream side of the screen such that the oxidant contacts the screen and the liquid fuel;

(d) energizing the glow plug thereby vaporizing the liquid fuel; and (e) recuperating heat in a recuperator positioned in fluid communication with said chamber and transferring said heat to the oxidant in the second inlet path.

3. An oxidation reactor comprising:
(a) a chamber;
(b) a heat-conductive reticulated screen positioned within the chamber, the screen configured in an annular shape defining an inner diameter and an outer diameter and disposed around a central longitudinal axis of the chamber defining an upstream side and a downstream side of the screen;
(c) an oxidation catalyst positioned within the chamber in fluid communication with and downstream from the screen;
(d) a first inlet path into the chamber, which terminates in a first orifice at the upstream side of the screen for delivering a flow of liquid fuel onto the screen, the first orifice directly contacting the screen or disposed proximate to the screen, so as to drip the liquid fuel onto the screen;
(e) a second inlet path into the chamber terminating at the downstream side of the screen for delivering a flow of oxidant into contact with the screen and the liquid fuel;
(f) disposed within the chamber a glow plug aligned along the central longitudinal axis of the chamber and disposed within a space defined by the inner diameter of the screen, the glow plug terminating flush with the downstream side of the screen;
(g) a constriction within the chamber disposed downstream of the screen and upstream of the oxidation catalyst;
(h) an outlet path in fluid communication with the oxidation catalyst for exiting gaseous oxidation product and heat of reaction from the chamber; and
(i) a recuperator positioned in fluid communication with the outlet path for transferring heat of reaction from the outlet path to the second inlet path.

4. The oxidation reactor of claim 3 wherein the heat-conductive reticulated screen is a metal mesh having wires ranging in diameter from 12.7 μm to 508 μm and having openings (or void spaces) ranging in length, diameter, or longest dimension from 17.8 μm to 508 μm.

5. The oxidation reactor of claim 3 wherein the catalyst comprises an ultra-short-channel-length metal substrate having one or more noble metals deposited thereon.

6. The oxidation reactor of claim 5 wherein the ultra-short-channel-length metal substrate has a channel length in a range from 25 microns to 500 microns.

7. The apparatus of claim 3 wherein the glow plug directly contacts the screen.

8. An oxidation process comprising:
(a) providing a chamber having positioned therein a heat-conductive reticulated screen configured in an annular shape defining an inner diameter and an outer diameter and disposed around a central longitudinal axis of the chamber defining an upstream side and a downstream side of the screen; and further having positioned therein a glow plug aligned along the central longitudinal axis of the chamber and disposed within a space defined by the inner diameter of the screen, the glow plug terminating flush with the downstream side of the screen; the chamber further comprising an oxidation catalyst in fluid communication with and downstream from said screen and further comprising a constriction disposed downstream of the screen and upstream of the oxidation catalyst;
(b) delivering a flow of liquid fuel into the chamber through a first inlet path terminating in a first orifice at the upstream side of the screen, the first orifice directly contacting the screen or disposed proximate to the screen, so as to drip the liquid fuel onto the screen;
(c) delivering a flow of oxidant into the chamber through a second inlet path terminating at the downstream side of the screen, so as to contact the flow of oxidant with the screen and liquid fuel;
(d) energizing the glow plug so as to vaporize and ignite the liquid fuel in flame mode;
(e) lighting-off the oxidation catalyst; and catalytically combusting or reforming the vaporized liquid fuel and oxidant thereby producing gaseous oxidation product and heat of reaction;
(f) exiting the gaseous oxidation product and heat of reaction through an outlet path positioned in fluid communication with the oxidation catalyst; and
(g) recuperating a portion of the heat of reaction in a recuperator positioned in fluid communication with the outlet path; and transferring the recuperated heat of reaction from the outlet path to the oxidant in the second inlet path.

9. The process of claim 8 wherein the fuel is selected from kerosene, diesel, JP-8, JP-5, and JET A fuels.

10. The process of claim 8 wherein a fuel input of greater than 50 $W_{th}$ and less than 5 $kW_{th}$ is employed.

11. The process of claim 8 wherein start-up from ambient conditions is accomplished in less than 1.3 minutes.

12. The process of claim 8 wherein the heat-conductive reticulated screen is a metal mesh having wires ranging in diameter from 12.7 μm to 508 μm and having openings (or void spaces) ranging in length, diameter, or longest dimension from 17.8 μm to 508 μm.

13. The process of claim 8 wherein the catalyst comprises an ultra-short-channel-length metal substrate having one or more noble metals deposited thereon, wherein the ultra-short-channel-length metal substrate has a channel length in a range from 25 microns to 500 microns.

14. The process of claim 8 wherein the glow plug directly contacts the screen.

15. A hybrid burner comprising:
(a) a combustion chamber;
(b) a heat-conductive reticulated screen positioned within the chamber, the screen configured in an annular shape defining an inner diameter and an outer diameter and disposed around a central longitudinal axis of the chamber defining an upstream side and a downstream side of the screen;

(c) a combustion catalyst positioned within the combustion chamber in fluid communication with and downstream from the screen;

(d) a first inlet path into the combustion chamber terminating in a first orifice at the upstream side of the screen for delivering a flow of liquid fuel onto the screen, the first orifice directly contacting the screen or disposed proximate to the screen, so as to drip the liquid fuel onto the screen;

(e) a second inlet path into the combustion chamber terminating at the downstream side of the screen for delivering a flow of oxidant into contact with the screen and the liquid fuel;

(f) a glow plug disposed within the combustion chamber in contact with the screen for heating the screen so as to vaporize the liquid fuel; the glow plug aligned along the central longitudinal axis of the chamber and disposed within a space defined by the inner diameter of the screen, the glow plug terminating flush with the downstream side of the screen;

(g) a constriction disposed downstream of the screen and upstream of the combustion catalyst;

(h) an outlet path in fluid communication with the combustion catalyst for exiting a gaseous oxidation product from the combustion chamber; and (i) a recuperator positioned in fluid communication with the outlet path for transferring heat of reaction from the outlet path to the second inlet path.

16. The hybrid burner of claim 15 wherein the heat-conductive reticulated screen is a metal mesh having wires ranging in diameter from 12.7 µm to 508 µm and having openings (or void spaces) ranging in length, diameter, or longest dimension from 17.8 µm to 508 µm; and wherein the catalyst comprises an ultra-short-channel-length metal substrate having a channel length ranging from 25 microns to 500 microns and having one or more noble metals deposited thereon.

17. A combustion process in a hybrid burner comprising:

(a) providing a combustion chamber having a heat-conductive reticulated screen positioned within the chamber, the screen configured in an annular shape defining an inner diameter and an outer diameter and disposed around a central longitudinal axis of the chamber defining an upstream side and a downstream side of the screen; a glow plug aligned along the central longitudinal axis of the chamber and disposed within a space defined by the inner diameter of the screen, the glow plug contacting the screen and terminating flush with the downstream side of the screen; the chamber further comprising a combustion catalyst in fluid communication with and downstream from said screen and further comprising a constriction disposed downstream of the screen and upstream of the combustion catalyst;

(b) delivering a liquid fuel into the chamber through a first inlet path terminating in a first orifice at the upstream side of the screen, the first orifice directly contacting the screen or disposed proximate to the screen, so as to drip the liquid fuel onto the screen;

(c) delivering an oxidant into the chamber through a second inlet path terminating at the downstream side of the screen, such that the oxidant contacts the screen and liquid fuel;

(d) heating the screen with the glow plug so as to vaporize and ignite the liquid fuel thereby initiating combustion in flame-stabilized mode with heat of reaction;

(e) transferring a portion of the heat of reaction to the combustion catalyst so as to light-off the catalyst and thereby catalytically produce gaseous oxidation product and added heat of reaction;

(f) exiting the gaseous oxidation product and heat of reaction from steps (d) and (e) from the combustion chamber through an outlet path; and transferring a portion of the heat of reaction in the outlet path via a recuperator to the oxidant in the second inlet path;

(g) extinguishing the flame and maintaining operation flamelessly and catalytically; and (h) de-energizing the glow plug.

* * * * *